Aug. 19, 1930.  G. A. ANDERSON  1,773,214
LOCOMOTIVE BOOSTER
Filed Dec. 6, 1924  5 Sheets-Sheet 1
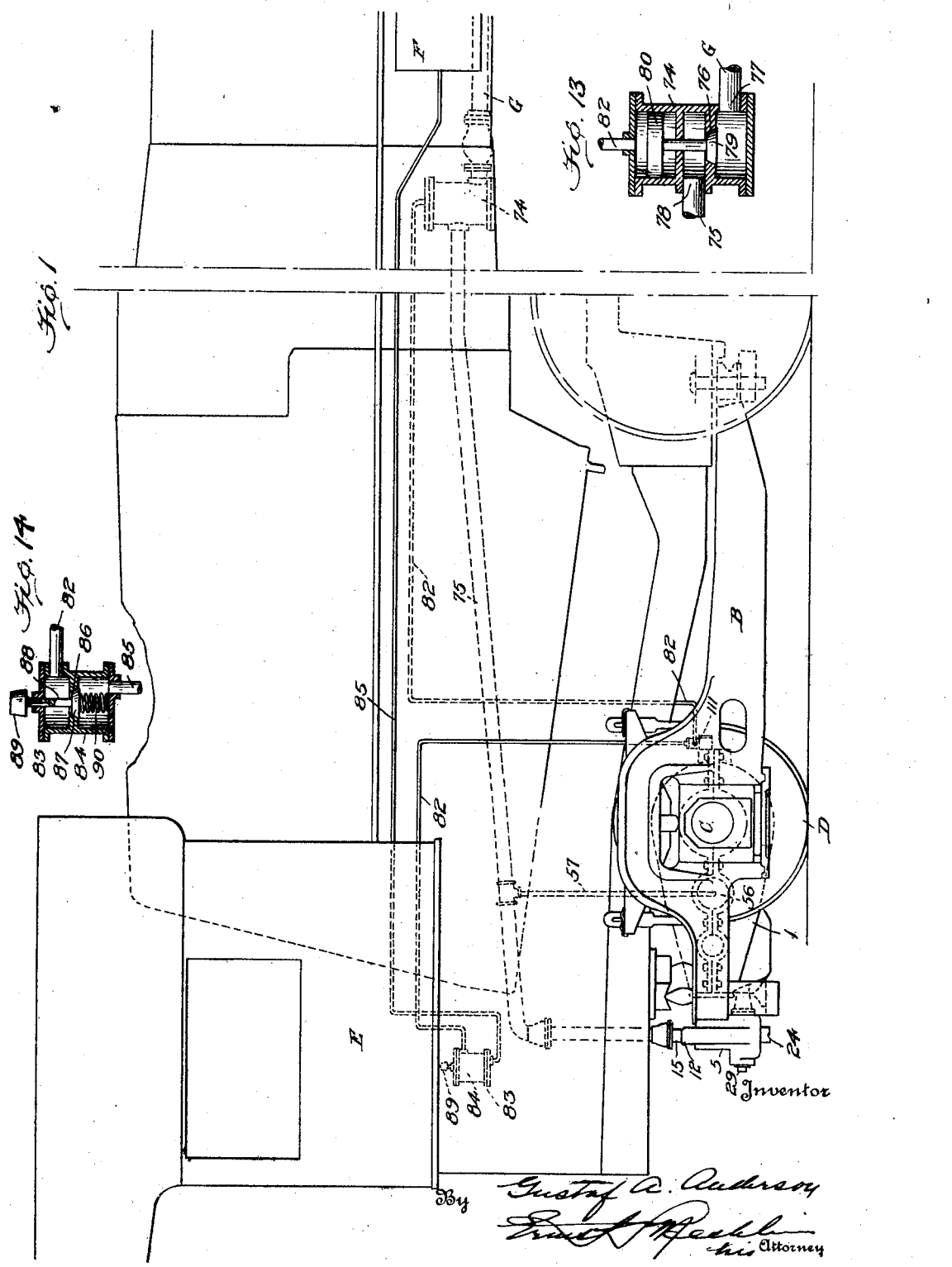

Aug. 19, 1930.  G. A. ANDERSON  1,773,214
LOCOMOTIVE BOOSTER
Filed Dec. 6, 1924   5 Sheets-Sheet 2
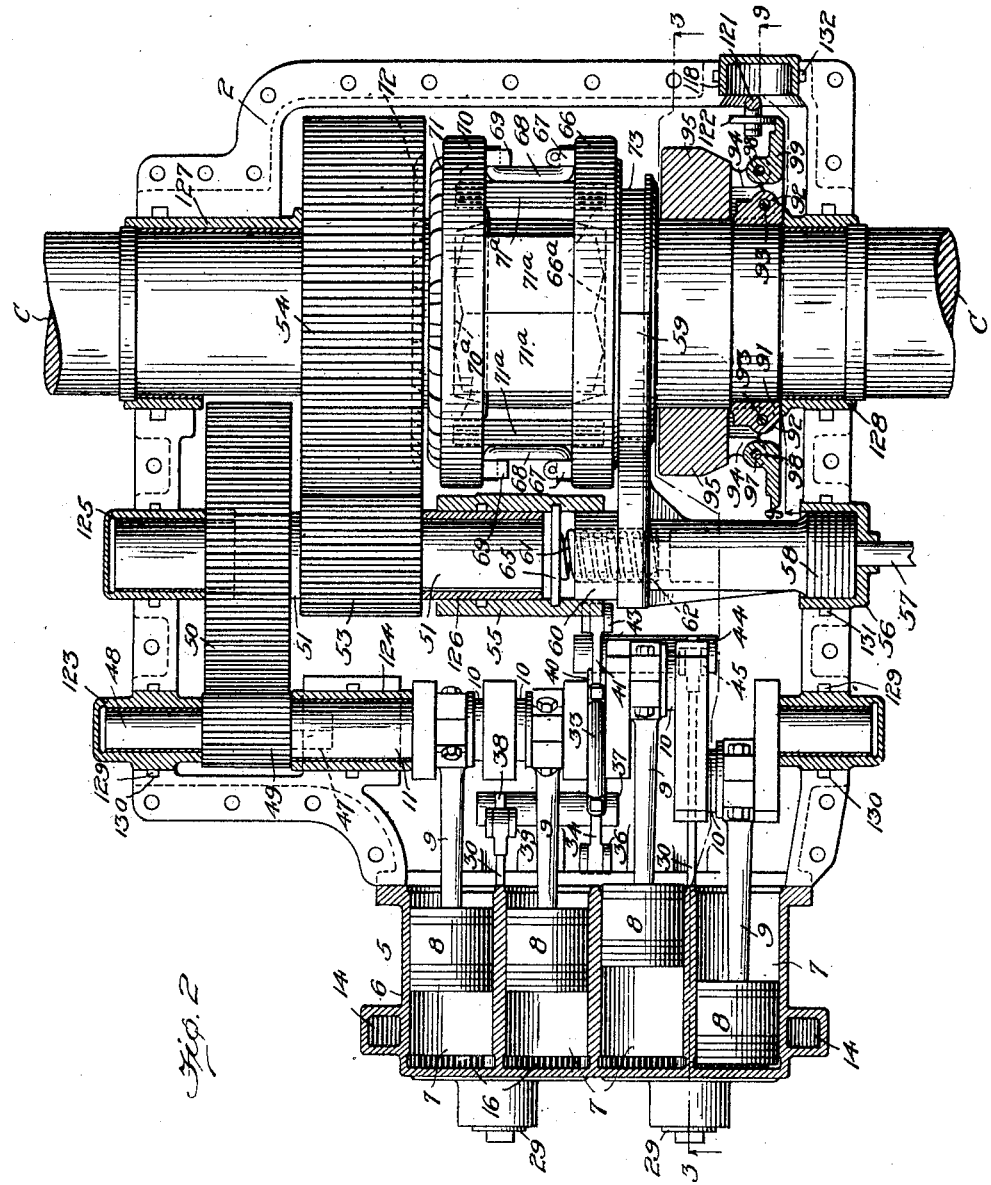
Inventor
Gustaf A. Anderson
By
his Attorney

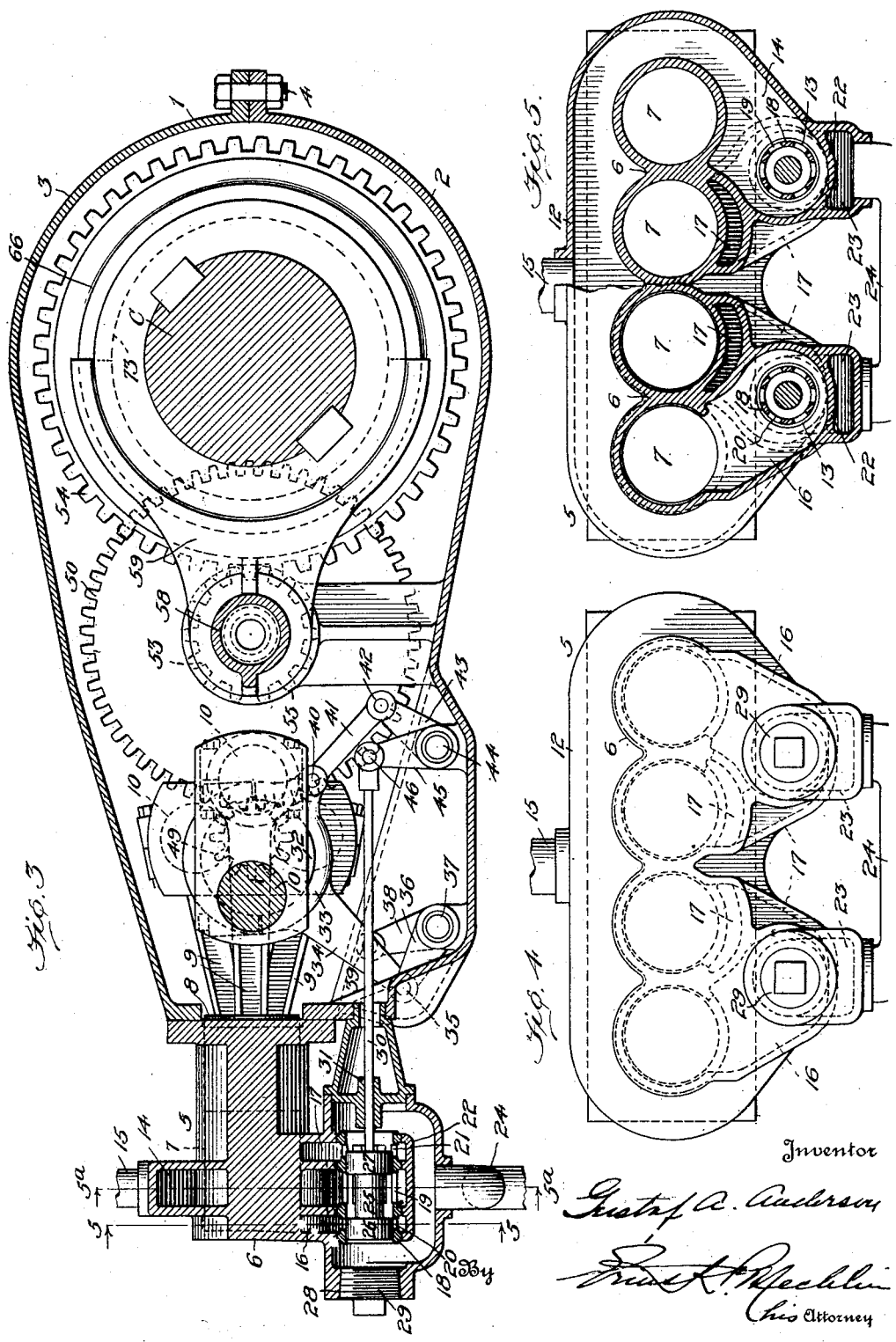

Aug. 19, 1930.  G. A. ANDERSON  1,773,214
LOCOMOTIVE BOOSTER
Filed Dec. 6, 1924  5 Sheets-Sheet 4

Inventor
Gustaf A. Anderson
By
his Attorney

Aug. 19, 1930.  G. A. ANDERSON  1,773,214
LOCOMOTIVE BOOSTER
Filed Dec. 6, 1924   5 Sheets-Sheet 5

Inventor
Gustaf A. Anderson
By Ernst H. Mechlin
his Attorney

Patented Aug. 19, 1930

1,773,214

UNITED STATES PATENT OFFICE

GUSTAF A. ANDERSON, OF BALTIMORE, MARYLAND, ASSIGNOR TO THE SYMINGTON COMPANY, OF NEW YORK, N. Y., A CORPORATION OF MARYLAND

LOCOMOTIVE BOOSTER

Application filed December 6, 1924. Serial No. 754,331.

The invention relates to locomotive boosters.

It is well known that power mechanism or boosters have been designed for use in connection with the trailer wheels of a locomotive for the purpose of applying power thereto and consequently assisting in propulsion, the device being used when the locomotive is traveling at a low speed as for instance when starting, or pulling a heavy grade. The common type of booster involves or embodies a suitable steam engine and transmission mechanism for applying power from the engine to the trailer axle, together with air or other control means for rendering the booster engine operative or inoperative at will. The ordinary type is defective in many respects, one objectionable feature being the necessity for the actual manipulation of a control means for rendering the booster inoperative when the speed of the locomotive reaches a point where continued action would be destructive. Another serious drawback is the employment of shiftable gears which must be meshed for coupling the engine to the trailer axle and unmeshed for effecting subsequent uncoupling.

The primary object of the invention, generally stated, is to provide a locomotive booster mechanism adapted to be thrown into operation by means controlled by the engineer or operator and so constructed and arranged as to be thrown automatically out of operation when the locomotive attains a certain predetermined speed, the automatic release of the driving connection avoiding damage to the mechanism.

A further object of the invention is to provide a booster in which the gears of the transmission mechanism between the booster engine and the trailer axle are constantly in mesh, the actual drive connection including a clutch mechanism for coupling the ultimate gear of the train to the trailer axle.

A still further object of the invention is to provide a booster in which the engine and transmission mechanism are so arranged and related and so connected with a control means that the clutch of the transmission mechanism will be thrown into operative position to couple the gearing to the axle simultaneously with actuation of the booster engine.

An object of the invention, more specifically stated, is to provide a mechanism of this character embodying a single acting steam engine, a transmission mechanism for applying the power thereof to the trailer axle, together with pneumatic means for controlling the admission of steam pressure to the engine and the clutch operating mechanism, and a speed responsive mechanism for automatically controlling said pneumatic means whereby feeding of steam to the engine and clutch mechanism will be automatically discontinued when the locomotive reaches a certain speed.

A further object of the invention is the provision of pneumatic control means adapted to be operated by the engineer and including a speed responsive cut-off mechanism interposed in the pneumatic line or circuit to thereby insure automatic and positive shutting off of the pressure applied or supplied to the booster device in the event of failure of the control means or inattention on the part of the operator.

Among other features the invention contemplates the provision of a clutch mechanism for coupling the booster engine to the trailer axle embodying a yieldable mounting for at least one clutch member to cushion the starting torque and eliminate undue shock to the working parts.

A detail feature of the invention is the specific construction of the frame or housing for the booster mechanism, the frame or housing having seated therein separable sectional bearings for the shafts of the booster mechanism and for the trailer axle, all of which have their axes lying in the same plane so that access to all the parts may be had upon removal of the top section of the frame and whereby removal and replacement of any or all shafts and parts thereon may be readily accomplished, the bearing elements or sections and other parts of the apparatus being furthermore of such construction as to be retained in place and prevented from longitudinal or turning movement without the employment of any fastening devices.

An additional object of the invention is to provide a mechanism embodying the above features of importance and so constructed and arranged that the operating and control mechanism will be comparatively simple and highly efficient, the construction embodying and involving many structural refinements and improvements which need not be specifically mentioned but which will appear during the course of the following detailed description, though it should be understood that the embodiment of the invention disclosed is for illustrative purposes only, and that the right is reserved to make all such changes in the construction and arrangement as will not depart from the spirit of the invention or the scope of the claims hereunto appended.

In the drawings:

Figure 1 is a diagrammatic side elevation of a portion of a locomotive showing the trailer wheels equipped with my booster mechanism, this view showing also the pneumatic control means for the pressure system.

Figure 2 is a plan view of the booster mechanism with a portion of the housing thereof removed, the booster motor or engine being shown in horizontal section.

Figure 3 is a vertical section taken longitudinally through the booster mechanism on substantially the line 3—3 of Figure 2.

Figure 4 is an elevation of the rear end of the motor or engine.

Figure 5 is a cross section through the engine taken on substantially the line 5—5 of Figure 3.

Figure 13 is a detail view of the steam valve.

Figure 14 is a detail view of the push valve.

Throughout the specification and drawings like parts are designated by like reference characters.

Figure 6:
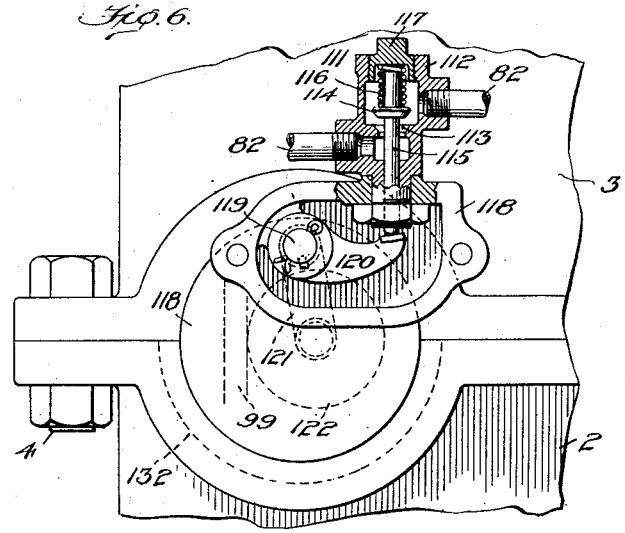
Figure 6 is a fragmentary front elevation of the booster mechanism at one corner thereof and illustrating the speed controlled cut-off mechanism for the pneumatic control line, the cut-off device itself being shown in section.
Figure 7:
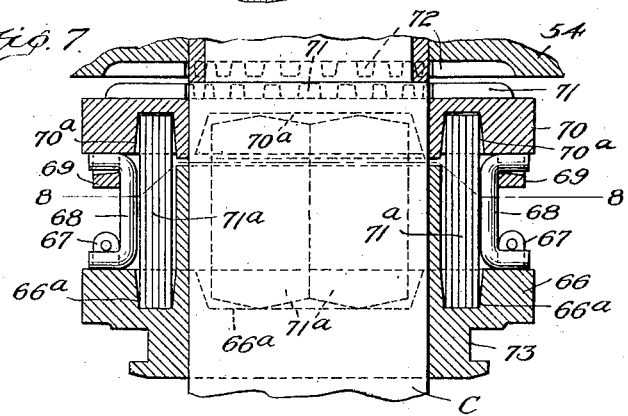
Figure 7 is a detail longitudinal section taken axially of the intermediate portion of the trailer axle and showing the clutch mechanism.
Figure 8:
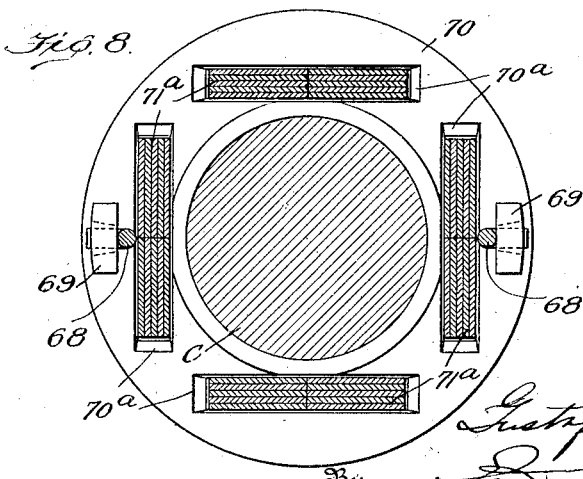
Figure 8 is a cross section through the clutch mechanism, the view being taken on the line 8—8 of Figure 7.
Figure 9:
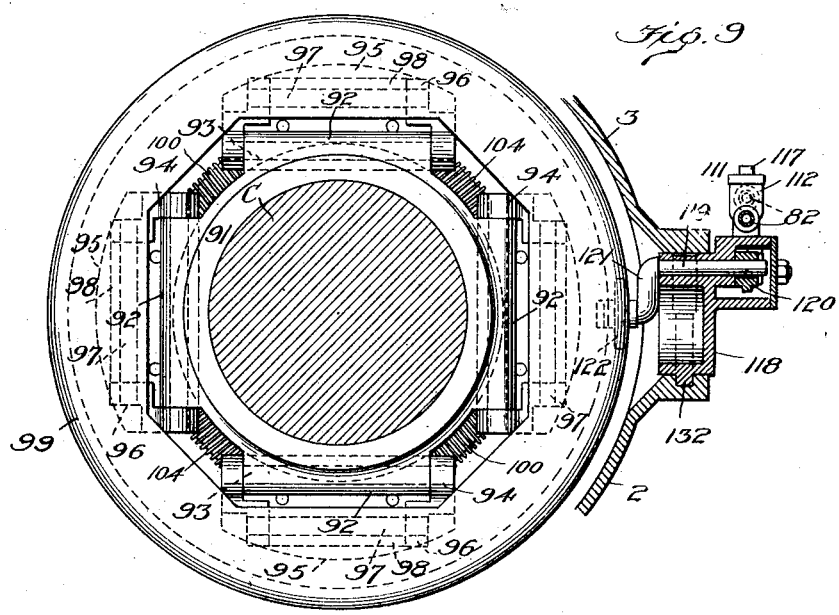
Figure 9 is a detail cross section through the trailer axle showing the speed responsive mechanism in elevation and showing the means for the automatic cut-off in section, the view being taken substantially on the line 9—9 of Figure 2.
Figure 10:
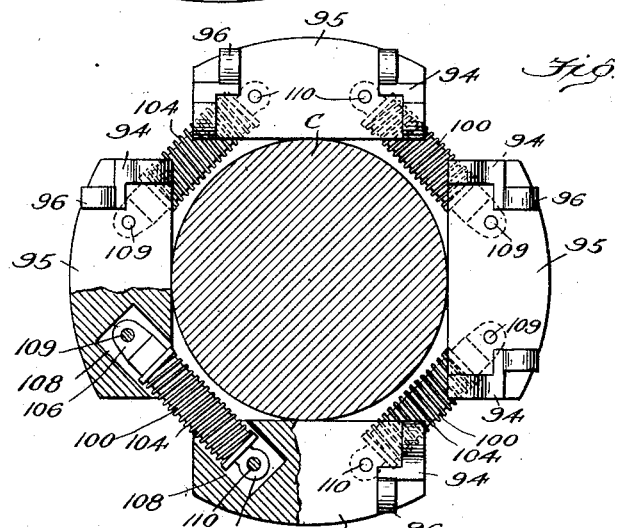
Figure 10 is a detail section through the trailer axle showing an elevation of the fly weights, portions thereof being in section to illustrate the spring shackles therefor.

Referring to the drawings in detail, the letter A designates a locomotive having the usual trailer including a frame B carrying an axle C on which are mounted the trailer wheels D. The letter E indicates the cab and the letters F and G represent, respectively, a compressed air reservoir and the steam line.

Suitably mounted upon or forming a part of the trailer frame or structure B is a combined supporting frame and housing which may, and preferably does, carry and enclose the entire booster mechanism. The frame or housing is designated generally by the numeral 1 and may consist of any suitable or desired number of parts, though it is here represented as formed of or including sections 2 and 3 detachably connected by some convenient means, as for example bolts 4. The trailer axle C extends transversely through said frame or housing which is provided with journal bearings, hereinafter described, in which said axle is mounted.

Located at and preferably mounted upon one end of the housing is a suitable motor or engine, indicated generally by the numeral 5. The engine disclosed is of the single acting multi-cylinder type and embodies certain features, notably a valve gear or operating means, covered by my U. S. Patent No. 650,890, dated June 5, 1900. The engine shown includes a block 6 having a plurality of cylinders 7 therein within which cylinders operate pistons 8 carried by connecting rods 9 connected with crank portions 10 of a crank shaft 11 which is journaled through the frame or housing preferably in parallel relation to the trailer axle C.

The cylinders are shown as arranged in groups of two and the engine is provided with a steam chest 12 common to both groups. The steam chest is so formed as to provide a cylinder 13 for each group, which cylinder communicates with a live steam chamber 14 into which steam is supplied through an inlet pipe 15. Each engine cylinder has a port at its rear or outer end portion and the port of one cylinder of each group communicates with a passage 16 while the other communicates with a passage 17. Referring to Figure 3, it will be seen that these passages are located at opposite sides of the chamber 14 and for this reason the passage 17 must extend longitudinally of the cylinders for a certain distance in order that it may communicate with the port at the outer end. Within each bore is a cage 18 slotted or ported at 19 for communication with the chamber 14, and slotted or ported at 20 and 21 for communication with the passages 16 and 17, respectively. Both ends of the cage are open. The engine body or the steam chest includes a portion 22 partially surrounding the lower portion of the chamber 14 to provide a compartment 23 into which the exhaust steam from the engine cylinders passes. The structure is the same for both groups, and the numeral 24 designates an exhaust pipe leading from both of the chambers or compartments 23. Slidable within each cage 18 is a piston or slide valve having an intermediate reduced portion 25 and heads 26 and 27 adapted to cover and uncover the slots or ports 20 and 21, respectively. The portion 22 of the engine body is shown as provided with an opening 28 axially of the cage and valve therein, for the purpose of permitting assembling of the parts and giving access thereto in case of necessity. This opening is normally closed by a removable plug or the like indicated at 29. Each valve is carried by a rod 30 slidably mounted within a suitable guide 31 and extending into the housing 1.

The valve operating gear is illustrated as including a cam or eccentric 32 on the crank shaft operating within an eccentric strap or carriage 33 movable laterally of the crank shaft and having an arm 34 pivotally connected at 35 with an arm 36 on a rock shaft 37 which is provided with an arm 38 pivotally connected at 39 with one of the valve rods 30. Pivotally connected at 40 to a point on the eccentric strap 33 is a link 41 pivotally connected at 42 with an arm 43 on a rock shaft 44 which carries an arm 45 to which the other valve rod 30 is pivotally connected, as at 46. The pistons 8, the crank portion of the crank shaft, and the valves are so arranged that a series of impulses will be given the crank shaft, as is customary in engine design.

In the operation of the engine itself, it will be seen that when the valve is moved rearwardly to such an extent that the head 26 uncovers the slots or portions 20, steam entering the chamber 14 through the pipe 15 will pass through the slots 19 into the cage 18 and then through the slots 20 into the passage 16 and thence into one cylinder. This occurs, of course, when the piston is at the rearward limit of its movement and the result is that the piston will be driven forwardly, imparting turning movement to the crank shaft. On the return stroke the spent steam in the rear of the piston exhausts through the passage 17 and slots or ports 21 into the cage and thence into the exhaust chamber 23 and out through the exhaust pipe 24. The parts are, of course, so timed that the intake and exhaust are alternately operated with the proper interval for the expansion of the steam. The pistons also move in alternation as is usual.

Mounted within the casing 1 in alinement with the crank shaft 11 and having a driving connection therewith, as for instance by means of a spline fitting within an angular socket 47, is a shaft 48 carrying a spur pinion 49 suitably secured thereon and meshing with a spur gear 50 on a countershaft 51. The shaft 51 is preferably located between the crank shaft 11 and trailer axle C and carries a spur pinion 53 in constant mesh with a ring gear 54 rotatably mounted upon the trailer axle but restrained from longitudinal movement thereon. It is preferable to provide a support 55 within the intermediate portion of the housing 1 for the purpose of carrying the inner end of the counter-shaft 51.

Mounted at one side of the housing 1 in axial alinement with the shaft 51 is a cylinder 56 having a steam conducting pipe 57 leading into its outer end. Slidable within this cylinder is a piston 58 carrying a laterally extending fork 59, said cylinder having an extension 60 slidable within the support 55. For holding the piston 58 normally at the outward limit of its movement, I preferably employ a coil spring 61 located within a socket or recess 62 in the piston 58 and abutting against a stop element 65 within the support 55.

Splined or otherwise mounted upon the trailer axle C for rotation therewith, and for longitudinal movement thereon, is a collar 66 having pivot bosses 67 thereon within which are rockably and pivotally engaged link elements 68 similarly engaged with pivot bosses 69 on a ring or collar 70 formed with or carrying a clutch face 71 adapted to co-act with a clutch face 72 on the ring gear 54. Interposed between the collars 66 and 70 are springs 71$^a$ preferably of the laminated type, which springs may have their end portions seated within recesses 66$^a$ and 70$^a$ in the collars 66 and 70, respectively, whereby to provide a yieldable or flexible connection between these collars, because of the resiliency of the springs and the frictional resistance generated by relative motion therebetween, permitting limited relative rotation so as to take up and absorb the shock incident to the torque occasioned by the application of power to the gear 54. The flexible or pivoted links 68 act to limit the relative rotary movement of the collars during such yielding and they further operate to prevent separation of the collars. Furthermore, as these links may be located in contact with the springs it is evident that distortion or buckling of the latter under strain will be avoided or at least limited. The collar 66 is formed with a groove 73 within which the above mentioned fork 59 engages so that when the piston 58 is moved inwardly, by means to be described, the fork will shift the clutch mechanism comprising the parts 66 to 71 longitudinally along the trailer axle for bringing the clutch face 71 into engagement with the clutch face 72 and locking or coupling the gear 54 to the trailer axle.

To set the booster in action it is necessary that steam be applied to the cylinder 56 to throw in the clutch as above mentioned and to supply steam to the engine. While this might be done in various ways, I have, for purposes of illustration, shown a pneumatically controlled steam valve 74 connected with the steam line G and with a pipe 75 leading to the pipe 15. The pipe 57 leading to the cylinder 56 connects with this pipe 75. While the specific construction of the valve 74 is not an essential feature it may conveniently be formed as a casing having a valve seat 76 between the steam inlet 77 and outlet 78. Co-acting with this valve seat is a valve 79 carried by a piston 80, the respective areas of the valve and piston being such that the pneumatic means operating on the piston 80 is sufficient to overcome the steam pressure acting upon the valve 79 and will in this manner maintain the valve open until the pneumatic means is cut off. Leading into the valve casing above the piston is a pipe 82 through which air under pressure may be conducted to the valve for the purpose of moving the piston and consequently unseating the valve so that steam may flow to the engine and clutch operating piston.

It is intended that some easily operated means be provided within the locomotive cab E for controlling the passage of compressed air to the steam valve 74 and while it is true that the specific means for this purpose might be varied within wide limits, a convenient arrangement is to provide a push valve, designated broadly by the numeral 83, mounted preferably on the cab floor in such position as to be depressed by the engineer's foot. This valve might include a body or casing 84 into which leads a pipe 85 leading from the compressed air source F. This casing is provided intermediate its ends with a valve seat 86 normally closed by a downwardly opening valve 87 carried by a stem 88 equipped with a head 89 adapted to receive pressure from the foot. A spring 90 may be provided for holding the valve normally seated though the pressure in the air line acts for the same purpose. The above mentioned pipe 82 connects with the valve body or casing 84 above the valve therein so that when the valve is depressed and opened air will be permitted to flow through the pipe 82 to the steam valve 74.

An important feature is the provision of an automatic or speed responsive means for throwing the entire booster out of operation when the locomotive attains a certain speed. In carrying out this feature I provide a governor mechanism which may include a collar 91 rigidly mounted upon the trailer axle C and provided with pivot bosses 92 upon which are pivoted, as at 93, knuckles 94 with fly-weights 95 which are adapted to swing outwardly under the influence of centrifugal force during the rotation of the trailer axle. These fly-weights are provided with pivot lugs 96 which are pivotally connected, at 97, with ears 98 on a ring 99 which is adapted to move longitudinally upon or with respect to the trailer axle though without contact therewith.

Figure 11:
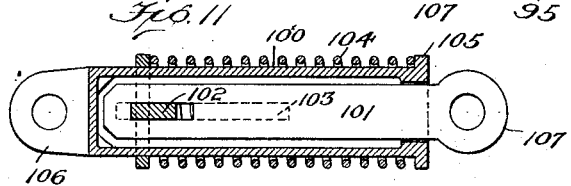
Figure 11 is a detail longitudinal section through one of the spring shackle members of the speed responsive mechanism.
Figure 12:
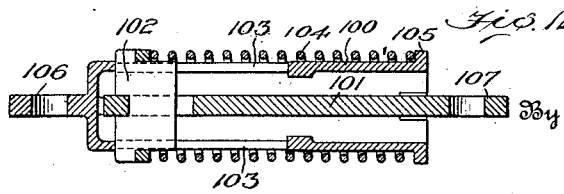
Figure 12 is a section taken at right angles to Figure 11.

For holding or maintaining the fly-weights normally in their inward position, use is made of spring means opposing outward movement under the influence of centrifugal force and a convenient arrangement is to provide resilient shackles connecting the adjacent fly-weights with one another. In Figures 11 and 12, I have illustrated an efficient structure for this purpose and referring to these figures the numeral 100 designates a sleeve within which is telescopically engaged a stem 101 through which passes a transverse abutment 102 movable along slots 103 in the sleeve and bearing against one end of a coil spring 104 arranged in encircling relation to the sleeve and abutting against an outstanding flange 105 at one end thereof. A plurality of these shackle devices is employed and the sleeve portions of the shackles are provided with apertured ears 106 while the stems terminate in eyes 107. These shackles have their end portions arranged within recesses 108 in the fly-weights and are held in place by securing elements 109 and 110 passing, respectively, through the ears 106 and eyes 107. Obviously, any tendency of the fly-weights to swing outwardly will cause compression of the springs 104.

The automatic control means further includes a valve mechanism, designated generally by the numeral 111, interposed in the pipe 82 and located near the speed responsive mechanism above described. This valve may include a suitable body or casing 112 provided at an intermediate point with a seat 113 adapted to be closed by a valve 114 on a stem 115. The sections of the pipe 82 communicate with the interior of this valve device above and below the seat 113 therein, as clearly indicated in Figure 6. The valve body 112 preferably contains a coil spring 116 acting normally to hold the valve 114 to its seat, and the tension of the spring may be adjusted by means of a threaded abutment 117 which is furthermore removable to permit access to the interior of the valve body for permitting assembling or replacement of parts. The valve body 112 is preferably mounted on or carried by a casing member 118 communicating with the interior of the frame or housing 1, and the valve stem 115 projects into this casing.

Journaled through a portion of the casing 118 is a rock-shaft 119 carrying a finger 120 arranged beneath the stem 115 and adapted to engage and move the same for unseating the valve 114. This rock shaft is shown as equipped or formed with a crank arm 121 carrying a roller 122 located in the path of movement of the ring 99 and held in engagement therewith by the spring 116 forming part of the valve structure. Normally, the ring 99 is in its innermost position so that the rock-shaft 119 will be maintained in such position that the finger 120 thereon engaging the stem 115 will hold the valve 114 off its seat so that there will be a free passage through the valve body for the compressed air in the pipe 82.

When the locomotive is at rest, the automatic control valve 111 is open, as above described and the steam valve 74 is closed. When it is desired to throw the booster into operation it is merely necessary that the engineer open the push valve by stepping upon or otherwise depressing the head 89. When this is done the valve 87 is forced from its seat and compressed air passes from the reservoir F through the pipe 85, through the push valve structure and pipe 82 through the valve structure 111 into the top of the steam valve 74 so that the piston 80 therein will be forced downwardly and will unseat the valve 79. Steam then passes from the steam line G, through the valve 74, pipe 75, and through the pipe 15 to the engine 5, causing actuation thereof in an obvious and well known manner so that the crank shaft 11 and pinion 49 thereon will be driven. Simultaneously with the application of steam to the engine, steam is conducted through the pipe 57 through the cylinder 56, causing the piston 58 to be moved inwardly, carrying the fork 59. The inward movement of the fork causes the clutch assembly comprising the parts 66 to 71 to be moved longitudinally of the trailer axle so that the clutch face 71 will be brought into engagement with the clutch face 72, thus locking the ring gear 54 onto the trailer axle. The rotation of the pinion 49 causes rotation of the ring gear 54, and consequently the trailer axle, through the instrumentality of the gears 50 and 53 so that the trailer axle will be positively driven by the engine 5. As the speed of rotation of the trailer axle increases, the tendency of the fly-weights 95 is to move outwardly against the resistance of the springs 104 of the shackle devices and when the rotary speed of the axle reaches a certain point, as for example when the locomotive attains the desired speed, generally approximately ten miles an hour, the tendency of the fly-weights to move outwardly under the influence of centrifugal force will be sufficient to overcome the resistance of the springs 104 and the fly-weights will swing outwardly to such an extent that the ring 99 connected therewith will be moved longitudinally of the axle away from the clutch member. When this movement of the ring occurs, the spring 116 in the valve mechanism 111 is permitted to act and operates to bring the valve 114 to its seat 113, thus cutting off communication through the pipe 82. It is probably preferable that the specific construction of the push valve be such that when the valve 114 is closed the air pressure within the air line between the valve device 111 and the steam valve 74 may escape through a suitable bleed, as for instance through the slotted or grooved stem of the push valve, as shown in Figure 14, so that the pressure on the piston 80 tending to hold the valve 79 open will be reduced to such an extent that the steam pressure below the valve 79 will cause closing thereof. Just as soon as this steam valve is closed, the supply of steam to the booster engine is cut off and the engine becomes idle or inactive while the spring 61 will act to force the piston 58 outwardly and effect disengagement of the clutch device on the trailer axle so that the ring gear 54 will be uncoupled therefrom and be permitted to remain stationary while the trailer axle revolves during the travel of the locomotive. Obviously, the booster mechanism may be rendered inactive or thrown out of operation at the will of the engineer, instead of by the automatic means, simply by releasing the pressure upon the push valve, though the automatic means is of great importance inasmuch as the booster mechanism will be thrown out of operation as soon as the speed of the working parts becomes such as to endanger them, the entire device being consequently safeguarded against the dangers caused by inattention or carelessness of the engineer. Furthermore, accidental operation of the booster by depression of the push valve while the locomotive is traveling faster than the predetermined limit, will be prevented.

Attention is directed to the construction of the housing and the mounting of the various shafts, trailer axle and other parts therein. These elements are shown as arranged with their axes lying in the same plane or at the line of separation of the two sections 2 and 3 of the frame or housing. The crank shaft 11 is mounted within bearings 123 and 124, the counter-shaft 51 within bearings 125 and 126, and the trailer axle C within bearings 127 and 128. The bearings 123 and 125 are shown as being closed at their outer ends for the purpose of excluding dust and dirt while the other bearings are necessarily open at both ends. However, each of these bearings is formed with a web 129 fitting within a groove 130 in the lower section 2 of the housing 1 so as to prevent the bearings from having any longitudinal movement. The upper section 3 of the housing fits down upon the ends of these webs so as to hold the bearings against turning movement. The cylinder 56 is mounted in the same manner inasmuch as it is provided with a corresponding web or rib 131.

To carry out this structural scheme throughout I have shown the casing member 118 as similarly provided with a web 132 and so arranged as to be held simply between the two sections of the housing 1. The advantages of this detailed arrangement are that these elements are not only prevented from displacement in any direction but are so held that in case of any necessity for repairing or replacing the parts the removal of the upper section 3 of the frame or housing will permit the lifting out of any of the shafts and parts thereon and the removal of the clutch controlling cylinder and also the automatic valve assembly.

A booster constructed in accordance with this invention will possess the distinct feature of being always in gear so that danger of stripping the gears on account of bringing them into mesh, will be avoided. The flexible or yieldable clutch mechanism is of importance inasmuch as it will cushion the starting torque and relieve the parts of shock and strain. The various features of importance and advantage have been brought out from time to time during the course of the above description and it is believed that the merits will be readily apparent.

While I have shown and described a certain engine or motor of the single acting type for applying power to the counter-shaft, it should be distinctly understood that although this particular engine is highly efficient for the purpose it could be replaced by one of a different type or construction without departing from the spirit of the invention, and it is equally true that although embodied on the locomotive for connection with the trailer axle it could, if desired, be connected to some other axle, for example, an axle on the associated tender and various changes and alterations may be made in the other structural features provided such modifications constitute no departure from the scope of the appended claims.

Having now described my invention, what I claim as new and desire to secure by Letters Patent, is:

1. The combination with an axle, of a booster engine, a transmission mechanism between the booster engine and the axle including constantly meshed gears idle with respect to the axle, and means for simultaneously operating the booster engine and resiliently connecting the transmission gears with the axle.

2. In a locomotive booster, the combination with the locomotive trailer axle, of a booster engine, a transmission mechanism between the engine and the axle including elements in constant operative relation to one another and to the booster engine and idle with respect to the axle, and means for simultaneously operating the engine and flexibly clutching the transmission mechanism to the axle.

3. In a locomotive booster, the combination with a locomotive trailer axle, of a booster engine, a transmission mechanism between the engine and the axle including a train of constantly meshing gears in constant operative relation to the engine, the ultimate gear of the train being on the axle and idle with respect thereto, means for clutching said ultimate gear to the axle, means for simultaneously supplying power to the engine and actuating said clutch means, manually controlled power operated means for controlling said means and speed responsive means for rendering said manually controlled means ineffective.

4. In a locomotive, the combination with the trailer axle, of a booster engine, a drive mechanism between the engine and the axle in constant operative relation, means on the axle for coupling the drive mechanism thereto, means for supplying power to the engine, means operating in unison with said means for controlling said coupling means, and speed responsive means on said axle for disconnecting said booster engine.

5. In combination with a locomotive, a booster engine, a transmission mechanism between the booster engine and an axle associated with the locomotive, said transmission mechanism being constantly in potential condition and including a rotary element rotatable with respect to the axle, means for setting the engine in normal operation and simultaneously clutching said rotary element onto the axle, and manually operated pneumatic means for actuating both of said means.

6. In combination with an axle of a locomotive, a booster engine, transmission gears between the engine and the axle, means for setting the engine in operation, means operating in unison with said means for operatively connecting the transmission gears with the axle, and a governor on the axle for stopping and disconnecting said booster engine at a predetermined speed.

7. In combination with an axle of a locomotive, a booster engine, a transmission mechanism between the engine and the axle, means for setting the engine in operation, means operating in unison with said means for operatively connecting the transmission mechanism with the axle, and speed responsive means on the axle for rendering the engine inoperative and disconnecting the transmission mechanism from the axle.

8. In a controlling means for a locomotive booster the combination of a booster engine, a drive connection between the engine and an axle of the locomotive, means for controlling the power supply to the engine, and speed responsive means operated by a governor on the axle, interposed in said control means for disconnecting the engine from the axle and at the same time cutting off the power thereto.

9. The combination with a trailer axle of a locomotive, of a booster engine, a drive connection between the booster engine and the axle, a clutch means interposed in said drive connection whereby to couple the same to the axle, means for supplying power to the engine and operating said clutch means, control means for said means, and speed responsive means interposed in said control means for simultaneously releasing said clutch and cutting off the power to the engine.

10. In a locomotive booster including the combination with a locomotive axle, of a booster engine, transmission mechanism between the engine and the axle, means for coupling the transmission mechanism to the axle, means for supplying power to said engine and operating said coupling means, means for controlling said power supplying means, and speed responsive means interposed in said control means for simultaneously rendering the engine inoperative and disconnecting said coupling means.

11. In a locomotive booster, the combination with an axle, of a booster engine, a transmission mechanism between the engine and the axle including a train of gears in constant mesh, and a clutch on the axle for coupling the ultimate gear thereto, the clutch including yieldably connected members for cushioning the starting torque.

12. In a locomotive booster, an engine, a member driven from the engine and rotatably mounted upon the trailer axle of the locomotive, a clutch on the axle for coupling said driven element thereto, means for supplying steam to operate said engine and clutch, and manually operated compressed air means for controlling the steam supplying means.

13. In a locomotive booster, an engine, a member driven from the engine and rotatably mounted upon the trailer axle of the locomotive, and a clutch on the axle for coupling said driven element thereto, said clutch including a member splined upon the axle, a second member rotatable with respect to the axle and the first named member, and a spring connection between said members permitting yielding of the second named member under starting torque.

14. In a locomtive booster, an engine, a member driven from the engine and rotatably mounted upon the trailer axle of the locomotive, and a clutch on the axle for coupling said driven element thereto, said clutch including a member slidable and non-rotatable upon the axle, a second member rotatable and movable longitudinally with respect to the first named member, a plurality of links connecting the members, and springs interposed between the members whereby to permit yielding of the second named member with respect to the first named member under starting torque.

15. In a locomotive booster, the combination with the locomotive trailer axle, of a booster engine, a releasable drive connection between the booster engine and the axle including a clutch mechanism, means for simultaneously operating the engine at a normal rate of speed and said clutch mechanism, and manually controlled pneumatic means for operating said means.

16. In a locomotive booster, the combination with the locomotive trailer axle, of a booster engine, a releasable drive connection between the booster engine and the axle including a clutch mechanism, means for simultaneously operating the engine and said clutch mechanism, manually controlled pneumatic means for operating said means, and means responsive to the speed of rotation of the axle acting independently of said second named means and controlling said first named means.

17. In a locomotive booster, the combination with a locomotive axle, of a booster engine, a transmission mechanism between the engine and the axle including a clutch mechanism for coupling the drive mechanism to the axle, pressure means for simultaneously operating the engine and the clutch mechanism, manually controlled pneumatic means for operating said means, and means for automatically discontinuing the operation of said engine at a predetermined speed.

18. In a locomotive booster, the combination with a locomotive axle, of a booster engine, a transmission mechanism between the engine and the axle including a clutch mechanism for coupling the drive mechanism to the axle, pressure means for simultaneously operating the engine and the clutch mechanism, manually controlled pressure means for operating said means, and means connected with said second named means and responsive to the speed of rotation of the axle for controlling said second named pressure means irrespective of manual operation thereof whereby to render the engine inactive and permit release of the clutch mechanism when the locomotive attains a predetermined speed.

19. In a locomotive booster, the combination with an axle, of a booster engine geared thereto, a pressure operated clutch mechanism for coupling the gearing to the axle, means for simultaneously supplying pressure to the engine and the clutch device, manually operable pneumatic means for controlling said means, and means interposed in the pneumatic means for rendering the same active or inactive irrespective of said manual means.

20. In a locomotive booster, the combination with an axle, of a booster engine geared thereto, a pressure operated clutch mechanism for coupling the gearing to the axle, means for supplying pressure to the engine and the clutch device, manually operable pneumatic means for controlling said means, and means interposed in the pneumatic means for rendering the same active or inactive irrespective of said manual means, said last named means including a control valve and a speed responsive mechanism on the axle for controlling the valve.

21. In a locomotive booster, the combination with an axle, of a booster engine geared thereto, a pressure operated clutch mechanism for coupling the gearing to the axle, means for supplying pressure to the engine and the clutch device, manually operable pneumatic means for controlling said means, and means interposed in the pneumatic means for rendering the same active or inactive irrespective of said manual means, said last named means including a valve and centrifugally operated means carried by the axle for controlling the opening and closing thereof.

22. In a locomotive booster, the combination with the locomotive trailer axle, of a booster engine, means for simultaneously operating said engine and operatively connecting it to the axle, pressure operated means under manual control for controlling said means, and speed responsive means interposed in said second named means and acting independently of the manual control for controlling the first named means.

23. In a locomotive booster, the combination with the locomotive trailer axle, of a booster engine, pressure operated means for coupling the booster engine to the axle, pressure operated means under manual control for controlling said means, and speed responsive means interposed in said second named means and acting independently of the manual control for controlling the first named means, said last named means including a pressure cut-off mechanism, and a centrifugal governor device on the axle operatively connected with the cut-off mechanism for rendering the engine inactive and throwing out the clutch device when the locomotive attains a predetermined speed.

24. In a locomotive booster comprising the combination with a locomotive trailer axle, of a booster engine having a crank shaft, a counter-shaft and gearing carried by the counter-shaft, crank shaft and axle, a combined frame and housing including sections, one of which is provided with recesses, and bearings for said shafts and axle fitting between the sections of the housing and having ribs fitting within said recesses.

25. In a mechanism of the character described including a plurality of shaft elements arranged with their axes in the same plane, a combined frame and housing including separable sections, one of which is provided with recesses, and bearings for the shafts fitting between the sections and having ribs received within said recesses and engageable by the other section whereby to prevent rotation and longitudinal movement of the bearings.

In testimony whereof I affix my signature.
GUSTAF A. ANDERSON.